US006502539B2

(12) United States Patent
Ribeiro et al.

(10) Patent No.: US 6,502,539 B2
(45) Date of Patent: Jan. 7, 2003

(54) ARTICULATED PISTON HAVING A PROFILED SKIRT

(75) Inventors: Carmo Ribeiro, Ann Arbor, MI (US); Roberto Bueno Nigro, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/872,728

(22) Filed: Jun. 1, 2001

(65) Prior Publication Data

US 2002/0179032 A1 Dec. 5, 2002

(51) Int. Cl.$^{7}$ .................................................. F16J 9/00
(52) U.S. Cl. ................................ 123/193.4; 123/193.6
(58) Field of Search ........................... 123/193.4, 193.6

(56) References Cited

U.S. PATENT DOCUMENTS 4,535,682 A 8/1985 Collyear et al.
4,648,309 A 3/1987 Schellmann
4,691,622 A 9/1987 Sander et al.
4,752,995 A 6/1988 Collyear et al.
4,760,771 A 8/1988 Felici et al.
4,809,591 A 3/1989 Rhodes et al.
4,903,580 A 2/1990 Bruni
5,076,226 A 12/1991 Watanabe et al.
5,115,726 A * 5/1992 Daxer et al. ............. 123/193.6
5,144,884 A * 9/1992 Kelly ...................... 123/193.6
5,172,626 A 12/1992 Hart
5,174,193 A 12/1992 Parker et al.
5,193,435 A 3/1993 Parker
5,251,540 A 10/1993 Rhodes et al.
RE35,551 E 7/1997 Bruni
5,682,808 A * 11/1997 Nakada .................. 123/193.6

* cited by examiner

*Primary Examiner*—Marguerite McMahon
(74) *Attorney, Agent, or Firm*—Reising, Ethington, Barnes, Kisselle, Learman & McCulloch, PC

(57) ABSTRACT

An articulated piston includes a crown and a separate skirt joined in articulated manner to the pin bosses of the crown by a wrist pin. The skirt has opposing thrust surfaces which contact the wall of a cylinder bore of an engine when the piston experiences side loading during operation. The thrust surfaces have a vertical profile which is generally symmetrical about a center plane containing the axis of a pin bore of the skirt. The profile includes tapered end sections and a wide, shallow central depressed region. Under normal operation, the depressed region channels lubricant to the pin bores. The twin peaked profile distributes side loads and stress above and below the pin bore plane and under heavy load, the depressed region bows outwardly presenting a flat, full contact surface between the peaked regions for decreasing the wear load on the thrust surfaces.

24 Claims, 2 Drawing Sheets

ARTICULATED PISTON HAVING A PROFILED SKIRT

BACKGROUND OF THE INVENTION

1. Technical Field

This invention relates generally to articulated pistons for use in heavy duty diesel engine applications, and more particularly to the construction of the skirt.

2. Related Art

Articulated pistons for heavy duty diesel engine applications have the skirt formed separately from the crown and joined in articulated manner through the wrist pin. The crown has an upper ring belt portion in which a plurality of ring grooves are cut for accommodating rings of the piston. A pair of pin boss portions depend from the upper ring belt portion and are formed with an aligned pin bore for receiving a wrist pin to connect the piston to a connecting rod. The crown of the piston is usually fabricated of steel. The articulated skirt of the piston is often fabricated of aluminum. The skirt is formed with a set of pin bores which align with the pin bores of the pin bosses to receive the wrist pin for connecting the skirt to the crown through the wrist pin such that the skirt is able to pivot slightly relative to the crown about the axis of the wrist pin and bores.

The skirt is formed with opposing cylinder wall-engaging thrust surfaces. The thrust surfaces confront the cylinder wall of the bore during the combustion cycle to take up side loads imparted on the piston in order to keep the piston aligned with the bore during operation. The profile of the piston skirt in the vertical direction of reciprocation is typically flat with the ends tapered slightly to provide smooth guidance of the skirt up and down in the piston bore. Under heavy side loading, the skirt flexes laterally, causing distortion of a vertical profile and typically inward cupping of the thrust surfaces toward the middle of the skirt in line with the pin bores. Such introduces high stress in the articulated piston skirt close to their pin bores which is undesirable.

U.S. Pat. No. 4,691,622 discloses a monobloc piston in which the crown and skirt are formed as one piece from the same lightweight aluminum material. In this one piece construction, the skirt extends in axial prolongation of the ring belt and as such the upper end region of the skirt is not free to move and flex in the manner of an articulated piston sleeve along with the rest of the skirt, having the effect of redistributing the stress on the skirt. In other words, the upper end region of a monobloc skirt which is tied to the solid ring belt portion is not able to flex laterally under load in the same manner that the lower free end might.

SUMMARY OF THE INVENTION

According to the invention, an articulated piston for an internal combustion engine is provided having a piston crown with a ring belt and a pair of depending pin bosses having axially aligned bores for receiving a pin. The piston includes a separately formed skirt having pin bores which are alignable with the pin bores of the crown for receiving a wrist pin therein to join the skirt to the piston crown in articulated manner. The skirt has a pair of outer thrust surfaces extending longitudinally between upper and lower free ends of the skirt. Each thrust surface has a longitudinal surface profile that is generally symmetrical about a lateral plane containing the axis of the aligned pin bores of the skirt and crown. The longitudinal profiling includes tapered end regions at the upper and lower ends of the skirt and a central depressed region having a lowest valley point substantially in line with the plane the pin bore axis. The profile further provides a pair of longitudinally spaced peaked regions disposed in substantially equal distance from the plane on opposite sides of the recess.

The invention has the advantage of providing a skirt profile having a central recess and a longitudinally spaced peaked regions which distribute loads and stress on the skirt during side loading away from the pin bore regions of the skirt.

The invention has the further advantage of decreasing the overall deformation of the skirt under load in a way that results in a reduction of mechanical stresses. The twin-peaked profile enables the skirt to deform at locations where contact occurs under load for a typical flat profile articulated skirt. By causing the skirt to deform in these regions due to the engineered profile, the contact area is spread out, decreasing the maximum wear load by a factor of about 3. This has the effect of decreasing the occurrence of scuffing and heavy wear marks often imparted to the thrust surfaces of conventional skirts as a result of heavy side loading accompanied by considerable piston skirt deflection.

Another advantage of the twin-peaked, central depression profile of the thrust surfaces is that the depression provides a reservoir for engine oil. Capturing the oil in the depression serves to reduce oil consumption and to channel the lubricant along the depression along the pin bores for providing additional lubricant to the wrist pin joint of the piston.

THE DRAWINGS

These and other features and advantages of the present invention will become more readily appreciated when considered in connection with the following detailed description and appended drawings, wherein.

DETAILED DESCRIPTION

Figure 1:
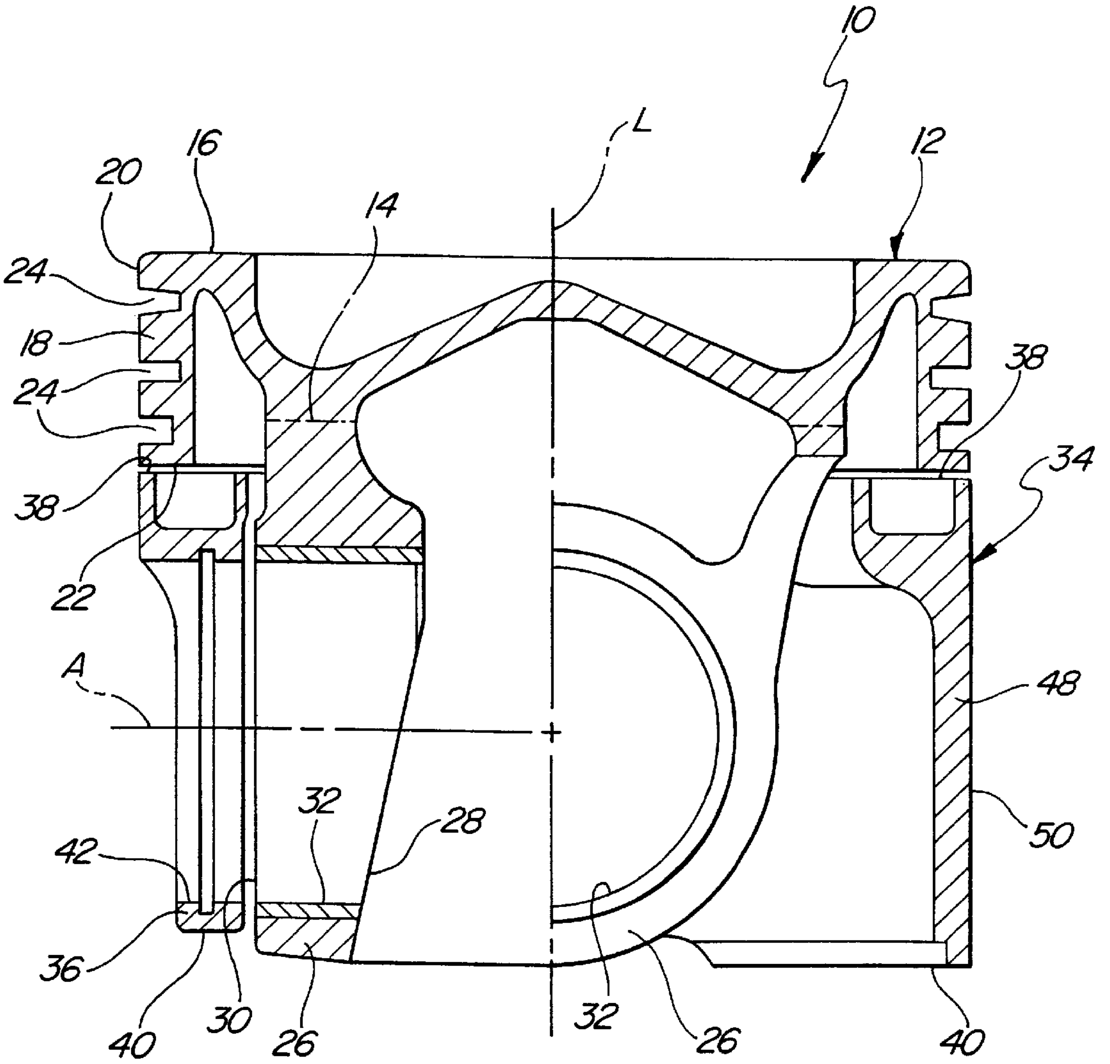
FIG. 1 is a split elevation sectional view of a piston constructed according to the invention.

An articulated piston constructed according to the invention for use in an internal combustion engine, such as a heavy duty diesel engine, is indicated generally at 10 in FIG. 1 and comprises a piston crown or head 12 fabricated of steel or the like of a single or multiple pieces which may be joined in any of a number of manners such as the illustrated friction weld joint 14. The piston head 12 has an upper surface 16 and a circumferentially extending ring belt portion 18 having an outer cylindrical surface 20 extending longitudinally between the upper surface 16 and a lower end 22 and formed with a plurality of circumferentially continuous grooves 24 for accommodating a plurality of rings (not shown).

A pair of pin boss portions 26 extend downwardly from the piston head 12. The pin bosses 26 have laterally spaced inner surfaces 28 defining a gap for receiving the small end of a connecting rod (not shown) and outer surfaces 30 which are spaced laterally inwardly of the outer surface 20 of the ring belt portion 18. The pin bosses 26 are formed pin bores 32 aligned along an axis A of the bores 32.

The piston 10 further includes a piston skirt 34 that is fabricated as a separate, independent structure from that of the head 12 and of the same or different material, such as aluminum. The skirt 34 has a pair of laterally spaced connecting walls 36 extending longitudinally between an upper end 38 and a lower end 40 of the skirt structure 34. The spacing of the connecting walls 36 enable them to be arranged laterally outward of the pin bosses 26. The connecting walls 36 are formed with axially aligned pin bores 42 which align with the pin bores 32 of the pin bosses 26 along the axis A. A wrist pin (not shown) is received in the aligned pin bores 32, 42 for coupling the crown 12 to the connecting rod (not shown) and for further coupling the skirt 34 in articulated fashion to the piston head 12 in conventional manner, such that the skirt 34 is able to pivot or rock about the axis A relative to the piston head 12.

The articulated piston skirt 34 is formed with a pair of laterally spaced, opposing skirt portions 48 extending between the upper and lower ends 38, 40 of the skirt structure 34 and coupled to one another through the connecting walls 36. The skirt portions 48 each present an outer arcuate thrust face or surface 50 for confronting the wall W of a cylinder bore (FIGS. 2 and 3) during reciprocation of the piston 10 within the cylinder bore during operation of the engine. The function of the thrust surfaces 50 is to take up any side loads imparted to the piston 10 during its reciprocation in the bore in order to keep the piston head 12 aligned in the bore to maintain proper sealing contact between the rings and the cylinder bore.

Figure 3:
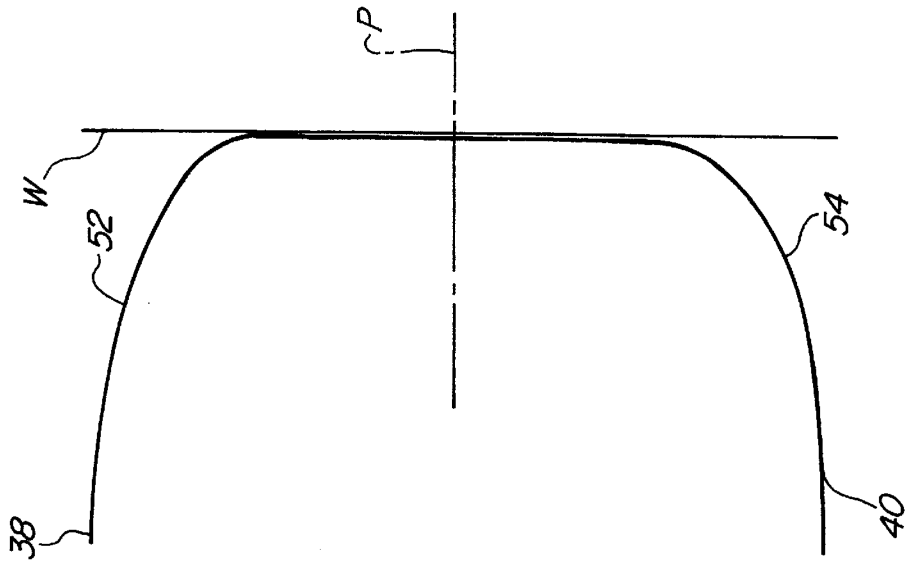
FIG. 3 is a view like FIG. 2 but showing the profile of the piston skirt under load.
Figure 2:
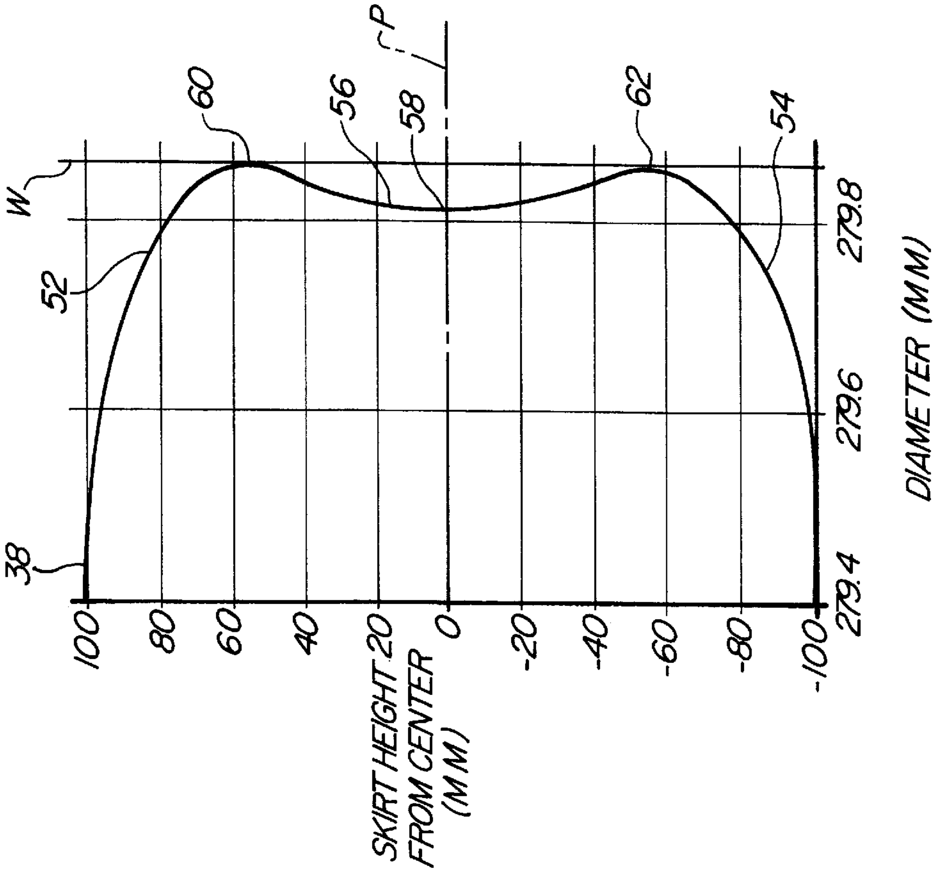
FIG. 2 is a greatly exaggerated profile plot of the piston skirt in an unstressed condition.

Referring additionally to FIGS. 2 and 3, each thrust surface 50 has an engineered longitudinal profile which serves to distribute the side loads imparted to the skirt in a particular manner. As shown, there is a lateral plane P that coincides with the axis A of the pin bores 32, 42. The plane P is perpendicular to a longitudinal axis L of the skirt structure 34. The longitudinal profile of the thrust surfaces 50 is generally symmetrical with respect to the plane P, and includes a reduced diameter tapered upper and lower end regions 52, 54 and a reduced diameter depressed region 56 having its lowest, smallest diameter valley point 58 aligned substantially with the plane P of the pin bore axis A. The depressed region 56 is fairly broad in comparison to the overall longitudinal length of the thrust surfaces 50, and a transition between the tapered end regions 52, 54 and the depressed region 56 is preferably smooth and rounded forming a pair of longitudinally spaced upper and lower peaked regions 60, 62 spaced longitudinally inwardly from the upper and lower ends 38, 40 of the skirt portions 48 and spaced approximately equidistantly on opposite sides of the central plane P. The profile of the peaked regions 60, 62 are thus preferably approximate mirror images of one another across the plane P.

Preferably, the span of the depressed region 56 between the peaked regions 60, 62 equals 40%–80% of the overall length of the thrust surfaces 50 between the upper and lower ends 38, 40. The highest point of the peaked regions 60, 62 is spaced longitudinally inwardly from the ends 38, 40 by a distance equal to about 10%–30% of the overall length of the skirt portion 48.

The peak-to-valley depth of the depressed region 56 is measured between the highest point of the peaked regions 60, 62 and the lowest valley point 58 of the depressed region is comparatively small to that of the width of the depressed region as measured between the peaks 60, 62. In the illustrated embodiment shown in FIG. 2, the overall skirt height between the ends 38, 40 is about 200 mm. The peak-to-peak width of the depressed region 56 is about 120 mm, whereas the peak-to-valley depth of the depressed region 56 is about 0.05 mm. Thus, the width/depth ratio of the depressed region is on the order of about 2400. Of course, this ratio could vary depending on the requirements of a particular piston application, but in any event it is contemplated that the width/depth ratio of the depressed region will be in excess of 500 and preferably 1000 or more.

The profile of the thrust surfaces 50 provides a controlled distribution of forces and stress when a side load is applied to the skirt portions 48 through contact with one of the other thrust surfaces 50 with the wall W of the cylinder bore during operation of the piston 10. When one or the other skirt portions 48 is forced against the wall of the cylinder bore as a result of an outward side load applied to the piston 10, the peak regions 60, 62 first come into contact with the cylinder wall and bear the load, distributing the load and stress across the skirt portions 48 with the regions of highest stress being spaced longitudinally above and below the central plane P of the pin bores 42 approximately in line with the location of the peaked regions 60, 62. Under severe loading, the wall of the skirt portions 48 flexes, causing the central depressed regions 56 to bow outwardly as shown in FIG. 3, in which the area between the peaked regions 60, 62 is essentially flat and is the same diameter as the peaked regions 60, 62, but with the tapered upper and lower end regions 52, 54 remaining. As such, the profile of the thrust surfaces 50 is precontoured, to develop, under load, a generally flat stressed profile for maximizing the contact area between the skirt portions 48 and the wall of the cylinder bore. By way of contrast, a conventional articulated piston skirt begins with a generally flat profile and has tapered ends but, under load, is caused to cup inwardly so as to concentrate the force and stress along the axis of the pin bores and decrease the contact area of the walls so as to effectively increase the wear load force on the thrust surfaces. The profiled thrust surfaces 50 of the invention thus behave under extreme loading in the manner that distribute stress away from the central plane P of the pin bores and reduces the wear load on the piston skirt to reduce the occurrence of scuffing of the thrust surfaces 50.

The upper ends 38 of the thrust surfaces 50 are spaced from the lower end 22 of the ring belt portion 18 and as such the skirt structure 34 is discoupled from the crown 12 apart from its connection through the wrist pin.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. An articulated piston construction for an internal combustion engine, comprising:

a piston head having a ring belt portion and a pair of depending pin bosses having axially aligned bores for receiving a pin;

a skirt formed separately from said head as an independent structure having axially aligned pin bores alignable with said pin bores of said pin bosses for receiving the pin therein to coupled said skirt in articulated manner to said head; and said skirt having a pair of outer thrust surfaces extending longitudinally between upper and lower ends of said skirt, each of said thrust surfaces having a longitudinal profile that is generally symmetrical about a central plane of said pin bores of said skirt, said profile including tapered upper and lower end regions and a central depressed region having a lowest valley point lying substantially in said plane of said pin bores, said profile providing a pair of peaked regions disposed in about equidistant spacing on either side of said plane.

2. The construction of claim 1 wherein said skirt has a predetermined length dimension between its said top and bottom ends, said peaked regions of said profile being located inwardly of said ends by a distance of about 20% of said length of said skirt.

3. The construction of claim 2 wherein said lowest point of said recess is located inwardly of said upper end by a distance of about 50% of said length of said skirt.

4. The construction of claim 2 wherein said depressed region has a width between said peaked regions equal to about 40%–80% of said length of said skirt.

5. The construction of claim 1 wherein said depressed region has a width dimension measured between said peaked regions that is at least 1000 times greater than a peak-to-valley depth dimension of said depressed region.

6. The construction of claim 1 wherein said depressed region has a width dimension measured between said peaked regions of about 120 mm.

7. The construction of claim 6 wherein said depressed region has a peak-to-valley depth dimension of about 0.05 mm.

8. The construction of claim 1 wherein said crown and said skirt are fabricated of metal.

9. The construction of claim 8 wherein said crown is fabricated of steel and said skirt is fabricated of an aluminum material.

10. The construction of claim 1 wherein the transitions from said peaked regions to said depressed region is rounded.

11. The construction of claim 1 wherein under thrust load said skirt flexes causing said profile to flatten under load.

12. The construction of claim 1 wherein said depression communicates with said pin bores of said skirt to provide a drainage path for the escape of lubricating oil from the depressed region during operation of said piston construction.

13. An articulated piston construction for an internal combustion engine, comprising:

a piston crown having a ring belt portion and a pair of pin bosses having axially aligned pin bores;

a skirt formed as a separate movable structure from said crown, said skirt having a pair of axially aligned pin bores alignable with said pin bores of said pin bosses for articulated support and movement relative to said crown; and said skirt having a pair of outer thrust surfaces extending longitudinally between upper and lower ends of said skirt, each of said thrust surfaces having a longitudinal profile when in an unstressed condition including a pair of upper and lower tapered end regions, a central depressed region and a pair of longitudinally spaced peak regions, said depressed region having a predetermined width measured between said peaked regions and a predetermined depth measured between the highest point of the peaked regions and the lowest point of the depressed region, said depressed region being relatively broad and shallow such that a width/depth ratio is provided exceeding 500.

14. The construction of claim 13 wherein said width/depth ratio exceeds 2000.

15. The construction of claim 13 wherein said profile is generally symmetrical about a central plane of said skirt passing through said axis of said pin bores of said skirt.

16. The method of claim 13 wherein said piston skirt has a predetermined length between said upper and lower ends thereof, said width of said depressed region measuring at least 50% of said length of said skirt.

17. The method of claim 13 wherein said width of said depressed region equals about 40%–80% of a predetermined length of said skirt between said upper and lower ends thereof.

18. The method of claim 17 wherein said peaked regions are spaced longitudinally inwardly from said ends of said skirt by a distance of about 10%–30% of said skirt length.

19. The method of claim 13 wherein said depressed region of said profile bows outwardly under a side load applied to said skirt to provide a generally flat surface profile under stress between the original peaked regions.

20. A method of making an articulated piston for an internal combustion engine, comprising:

forming a piston crown having a ring belt portion and a pair of pin boss portions formed with aligned bores;

forming a skirt as a separate independent structure from the piston crown having a pair of pin bores with an axis alignable with the pin bores of the pin bosses for receiving a pin for coupling the skirt in articulated manner to the piston crown;

providing the skirt with a pair of thrust faces; and forming a longitudinal profile on the thrust faces that is generally symmetrical with respect to a lateral plane containing the axis of the pin bores of the skirt, the profile including a pair of tapered end regions at upper and lower ends of the skirt transitioning into a central depressed region having a lowest valley point substantially in line with the lateral plane and presenting a pair of longitudinally spaced peaked regions spaced about equidistantly on opposite sides of said lateral plane.

21. The method of claim 20 wherein the width of said depressed region between said peaked regions is at least about 1000 times greater than a peak-to-valley depth of said depressed region.

22. The method of claim 20 including making the piston crown of a steel material and making the skirt of an aluminum material.

23. The method of claim 20 wherein the profile is formed to locate the peaked regions inwardly from the ends of the skirt by a distance equal to about 10%–30% of the length of the skirt between the ends.

24. The method of claim 20 wherein the depressed region is formed to communicate with the pin bores of the skirt to define a drain path for lubricant.

* * * * *